Figures 1A, 1B:
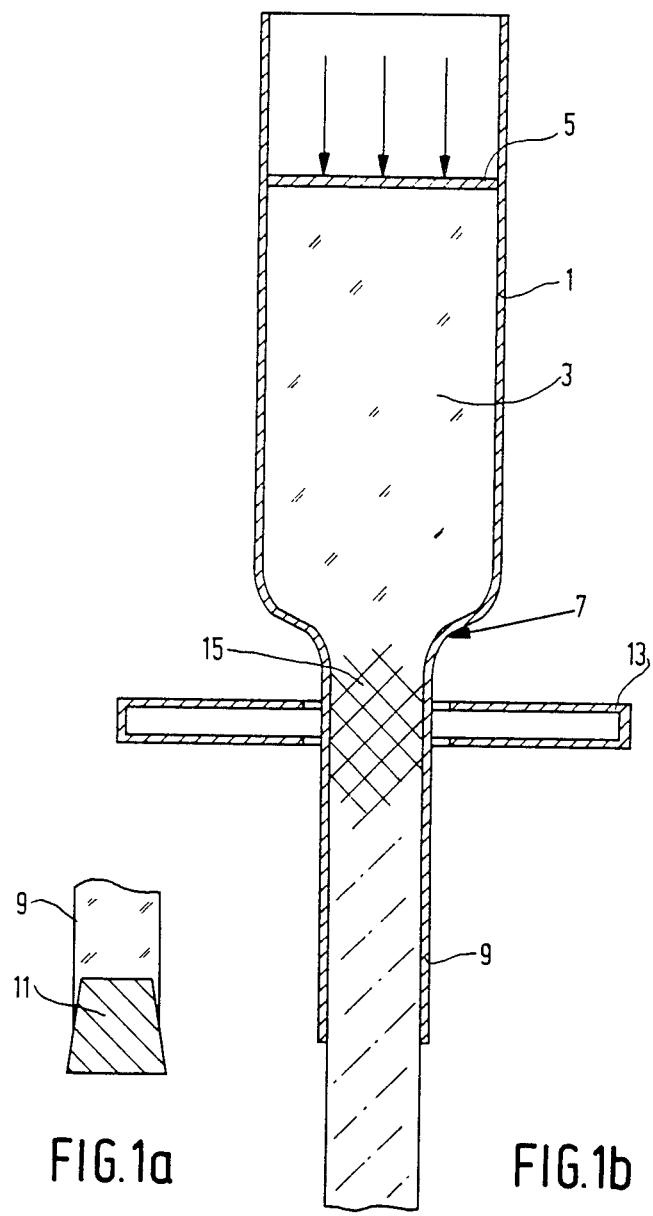

United States Patent [19]

Clasen

[11] Patent Number: 4,682,995
[45] Date of Patent: Jul. 28, 1987

[54] METHOD FOR THE MANUFACTURE OF GLASS BODIES BY EXTRUSION

[75] Inventor: Rolf Clasen, Aachen, Fed. Rep. of Germany

[73] Assignee: U.S. Philips Corporation, New York, N.Y.

[21] Appl. No.: 836,925

[22] Filed: Mar. 6, 1986

[30] Foreign Application Priority Data

Mar. 29, 1985 [DE] Fed. Rep. of Germany ....... 3511450

[51] Int. Cl.⁴ .......................................... C03B 37/016
[52] U.S. Cl. ........................................ 65/18.1; 65/2; 65/3.11; 65/3.12; 65/17; 65/900; 65/901; 156/DIG. 108; 264/23; 264/64; 501/12
[58] Field of Search ..................... 65/2, 3.11, 3.12, 17, 65/18.1, 18.3, 18.4, DIG. 16, 13, 900, 901; 501/12; 156/DIG. 108; 264/64, 23; 425/378 R

[56] References Cited

U.S. PATENT DOCUMENTS

| | | | |
|---|---|---|---|
| 3,285,786 | 11/1966 | Katz | 264/104 X |
| 3,665,064 | 5/1972 | Mosier et al. | 264/104 |
| 3,966,381 | 6/1976 | Suh | 425/376 R |
| 4,417,910 | 11/1983 | Passaret | 65/18.4 X |
| 4,420,294 | 12/1983 | Lichtinghagen | 264/27 |
| 4,451,116 | 5/1984 | Pinnow | 65/2 X |
| 4,541,855 | 9/1985 | Scherer | 65/18.1 |
| 4,605,428 | 8/1986 | Johnson et al. | 65/18.1 X |

FOREIGN PATENT DOCUMENTS

| | | | |
|---|---|---|---|
| 59-131538 | 7/1984 | Japan | 65/18.1 |
| 59-152235 | 8/1984 | Japan | 65/2 |
| 60-54928 | 3/1985 | Japan | 65/17 |

*Primary Examiner*—Robert L. Lindsay
*Attorney, Agent, or Firm*—Norman N. Spain

[57] ABSTRACT

Method and equipment for the manufacture of glass bodies wherein a porous green body is formed by extrusion from the starting material for the glass body in the form of a thixotropic suspension and this green body is then purified and sintered, during which process the starting material is brought in a state of minimum viscosity into an extruding press closed at its outlet end, is heated in the extruding press to a temperature below the boiling point of the dispersing liquid and then, after the extruding press is opened, is extruded into a green body of dimensionally stable shape by means of the die of the extruding press.

11 Claims, 2 Drawing Figures

METHOD FOR THE MANUFACTURE OF GLASS BODIES BY EXTRUSION

The invention relates to a method for the manufacture of glass bodies wherin a porous green body is formed by extrusion from the starting material for the glass body in the form of a thixotropic suspension and this green body is then purified and sintered.

The invention also relates to equipment for the implemention of such a method and the application of glass bodies produced in accordance with the method of the invention.

The method referred to in the preamble is particularly suitable for the manufacture of preforms for optical waveguides of fused silica.

Optical waveguides are used for a variety of applications, e.g. for short-distance light-transmission equipment or long-distance light-transmission systems such as in the case of optical communications systems, and consist mainly of a glass with high silica content (which, if required, contains a doping agent for adjusting the refractive index of the glass).

Glasses which are suitable for optical waveguides can also be uses to advantage for the manufacture of envelopes for halogen or gas discharge lamp because these glasses, like the glasses for optical waveguides, must be almost water-free and have a high silica content.

British Pat. No. 1010702 describes a method in which pure or almost pure powdered $SiO_2$ with a liquid binder in a quantity of 1 to 50 wt. % and, where appropriate, a further lubricant to promote the extrusion process in a quantity of 0.1 to 10 wt. % per $SiO_2$ content is worked into an extrusion mass and formed by an extrusion process. Examples of liquid binders which may be used are organic liquids such as polyvinyl alcohol or water. This method corresponds to the ceramic technique in which ground, powered raw materials with grain diameters of >1 um are processed with water, binders and lubricants into a high-viscosity extrudable mass.

In the processing of highly disperse starting powders with grain diameters of <1 um (which cannot be produced by conventional grinding processes), such as are used for the manufacture of fused silica bodies, particularly for preforms of optical waveguides, problems arise with the mixing and/or kneading particularly when the starting mass has a high solids content because a much larger number of particles have to be uniformly distributed and a much larger surface has to be uniformly covered with the additives (binders and lubricants). Thus, for example, the typical mixing and kneading times for a starting material of highly disperse fused silica particles (10 to 100 nm particle diameter) with 60 wt % $SiO_2$ and 36 wt. % water (residue of additives) are one to three hours. In addition to this substantial time requirement for homogenization of an extrudable starting material, there is a further problem: when using commercial kneading or mixing equipment the longer kneading time means increasing abrasion so that metal contaminants get into the starting mass. For materials from which optical waveguides are to be made, however, even impurities, in the form of transition metals for example, in the ppb range can create problems because they adversely affect the transmission behaviour for optical radiation of fused silica bodies made from these starting materials. Such contaminants, therefore, have to be removed again from a green body by very expensive purification processes. Another very serious problem which arises during the kneading of highly filled starting materials is caused by the inclusion of air bubbles which, on account of the high viscosity of a starting mass to be processed by extrusion, can no longer escape from the mass unassisted and lead to inhomogeneities of the green body and of the fused silica body sintered from it.

Less highly filled starting materials, e.g. in the from of low-viscosity suspensions, from which included gas bubbles can more readily escape on their own, are not suitable however for an extrusion process because it is impossible to produce dimensionally stable extruded bodies.

The aim of the invention is to provide a method, and equipment to implement this method, by which it is possible to produce dimensionally stable green bodies by an extrusion process from a starting material for the manufacture of glass bodies in the form of a relatively low-viscosity suspension with a solids content of highly disperse particles.

The invention achieves this aim as follows: the starting material in a state of minimum viscosity is charged into an extruding press closed at its outlet end, is heated in the extruding press to a temperature below the boiling point of the dispersing liquid and then, after the press is opened, is extruded into a green body of dimensionally stable shape by means of the die of the extruding press.

Equipment for implementing this method is characterized by an extruding press with a container for holding starting material for the glass body in the form of a low-viscosity suspension, a ram with which the suspension can be pressed in the direction of the outlet nozzle, an outlet tube connected to the outlet nozzle which, at the end opposite to the outlet nozzle, can be closed with a plug and a device whereby in a heating zone high-frequency or microwave energy can be introduced into the outlet tube and the suspension contained in it.

The invention is based on the finding that a particularly strong thixotropic effect occurs with suspensions of highly disperse $SiO_2$ particles of diameters ranging from 10 to 500 nm, which is reinforced still further by addition of an ionogenic substance which promotes the cross-linking of the solid particles in the suspension and shifts the pH-value of the suspension into the acid region (pH <3) or towards the basic region (pH 5.5 to 8), and this effect can be utilized first of all to liquefy the startyng material by the action of mechanical forces, preferably sound or ultrasound, i.e. convert it into a state of minimum viscosity, whereby in the liquefied state the starting material can be efficiently homogenized and compacted and, in the re-solidified state after discontinuation of the mechanical forces, can be formed, in particular extruded, in which situation cross-linking reactions between the solid particles of the suspension can be accelerated by heating the suspension to temperatures below the boiling point of the dispersing agent.

In accordance with advantageous embodiments according to the invention, the starting material used for the glass body is a suspension which contains $SiO_2$ particles with a diameter in the range from 10 to 500 nm, preferably 15 to 100 nm, with an average particle diameter of 40 nm, and with a solids: dispersing liquid weight ratio from 1:0.8 to 1:2. This has the advantage that when an ionogenic substance which shifts the pH-value of the suspension towards the basic region is added in a quantity of 0.1 to 5.0 wt. %, preferably 0.5 to 1.0 wt. % of the solids content of the suspension, a particularly strong thixotropic effect is obtained and very homogeneous, highly compacted green bodies can be produced by extrusion from such a starting material despite its high solids content of highly disperse solid particles.

According to further advantageous embodiments of the method according to the invention, an ammonium compound, in particular NH4F, in an aqueous solution is used as the ionogenic additive. Ammonium compounds are readily volatile and therefore can be removed without trace from the green body in a subsequent purification-heating step which means that fused silica bodies of very high purity can be produced. Thanks to the addition of an ammonium compound, for example NH3 in aqueous solution, green bodies of relatively high strength are obtained because gel formation occurs at the points of contact of two primary SiO2 particles.

At a suspension temperature of 20° C. and a pH-value of $\leq 10$, for example, SiO2 of the order of approx. 100 ppm passes into solution and is deposited at the contact points and thus forms a bridge layer. If NH4F in aqueous solution is used as the ionogenic additive, flourine doping, which is suitable for example, for the manufacture of cladding glasses for optical waveguides, can be achieved.

According to another advantageous embodiment of the method according to the invention, the starting material is transformed into a state of minimum viscosity by the action of sound at a frequency f in the range from 50 to 200 Hz or ultrasound at a frequency f in the range from 20 to 50 kHz. A gel-sol transformation occurs in thixotropic systems with any form of mechanical action, e.g. also stirring or shaking. If, however, a sonic or ultrasound oscillator the amplitude of which is such that the sonic or ultrasonic field is introduced into the starting material is used for the purpose of liquefying a high viscosity starting material, then this results in a particularly rapid liquefaction of the starting material and therefor efficient removal of packing cavities in the starting material (gas bubbles rise upwards in the liquefied starting material and are thus automatically eliminated). Such degassing can be further accelerated, for example, by liquefaction of the starting material in vacuum. The procedure using this development of the invention is especially advantageous for the homogeneous preparation of high-viscosity compounds which are to be further treated in an extrusion process.

According to a further advantageous embodiment of the method according to the invention, the starting material is heated in the extruding press by the application of microwave or high-frequency energy to a temperature below the boiling point of the dispersing liquid. This procedure is based on the knowledge that cross-linking reactions between primary particles such as occur in thixotropic systems can be decisively accelerated by elevated temperatures below the boiling point of the dispersing liquid. Moreover, aqueous suspensions can be advantageously heated directly by means of applied microwave energy.

One of the special benfits obtainable with the invention is the fact that extrudable masses with highly disperse solid particles can be homogenized particularly efficiently. Another benefit is the fact that with a continuous extrusion process green bodies of any cross-section can be obtained which are particularly suitable as preforms for optical waveguides. On the one hand, they are firm enough to be handled without difficulty and have the high density (35 to 50 % of the density of compact fused silica) desired for subsequent sintering of the green body while, on the other hand, they are porous and therefore gas-permeable so that, after being dried, they can be efficently purified in a purification stage in a heated gaseous phase reacting with any contaminants present. Another substantial benefit is the fact that exceptionally homogeneous green bodies can be obtained; this is important not only from the point of view of achieving bubble- and ream-free glass bodies, but also for the drying of the extruded green bodies. Dry cracks often occur specially at inhomogeneities in the green body.

However, dry cracks also occur as the result of inadequate binding forces between the solid particles, that is to say when the surface of the solid particles is not sufficiently covered with additives promoting cross-linking reactions. This problem in the case of high-viscosity systems with large surfaces, and the method of the present invention offers a definite improvement as a result of the very good homogenization of the starting material which can be achieved.

The principle of the invention will be explained in greater detail with the reference to the drawing FIG. 1b of which shows a sectional view of part of an extruding press according to the invention in two operating states and FIG. 1a of which shows a sectional view of a plug closed outlet tube of the apparatus of FIG. 1a.

A supply vessel 1 contains sound- or ultrasound-liquified starting material for the production of a glass body in the form of a low/viscosity suspension 3 (see FIG. 1b). The liquification of the starting material is effected outside the equipment shouw by means of a sound oscillator at a frequency of f=50 Hz or an ultrasound at a frequency of f=35 kHz brought into positive contact with the starting material to be liquified. The suspension 3 is pressed by a ram 5 through the die of the extruding press in the form of an outlet nozzle into an outlet tube 9 connected to the outlet nozzle 7 and made of a low-loss dielectric material. Examples of eligible materials for the outlet tube 9 include glass or synthetic material, e.g. polytetrafluoroethylene. A microwave resonator 13 is used to introduce microwave energy into the outlet tube 9 so that a heating zone 15 is created in which the suspension 3 is heated to just below the boiling point of water.

This heating of the suspension brings about very strong cross-linking of the highly disperse primary particles over the entire cross-section of the outlet tube which leads to such a rise in the viscosity of the suspension 3 that it can be extruded and dimensionally stable extruded articles obtained. At the beginning of the procedure the outlet tube 9 is closed with a plug 11 until the initially low-viscous suspension 3 in the area of the heating zone 15 is cross-linked and therefore solidified to such an extent that it can no longer flow out of the outlet tube 9 (cf. FIG. 1a). Then, suspension 3 is pressed by the ram 5 such that it can solidify in the heating zone 15.

A dimensionlly stable billet which can be dried in known manner then comes out of the outlet tube 9. Uncontrolled drying of the green body does not occur as a result of the heating in heating zone 15 because the zone is sealed off from the environment.

A specific embodiment of the invention is shown in the following example:

A suspension of 200 g highly disperse $SiO_2$ with a particle size in the range from 10 to 100 nm and a mean particle diameter of 40 nm is mixed in a glass vessel with 30 ml of a 5% aqueous $NH_4F$ solution and with 190 ml distilled water and is placed in an ultrasonic bath (f=35 kHz) for 10 min while still being stirred. In this way, a homogenous, low-viscosity suspension free from air bubbles is obtained which is charged into the container 1 which, as FIG. 1b shows, tapers down into an approx. 5 cm long outlet tube 9 of 16 mm diameter. Mounted on the outlet tube 9 is a microwave resonator 13 which introduces a power of approx. 150 W with a frequency of f=2.45 GHz into the suspension 3 in the outlet tube 9 over a length of approx. 1 to 2 cm. In this process, the suspension 3 attains a temperature of approx. 80° C. After solidification of the suspension 3 in the heating zone, a dimensionally stable billt is pushed out from the extruding press by the ram 5 at a rate of 10 cm/min and a pressure of 0.2 bar, after the plug 11 at the end of the outlet tube 9 has been removed. The pressure on the ram 5 needs only to be high enough to overcome the wall friction losses in the outlet tube 9. The green body thus obtained was slowly dried in air in 24 hours and then heated in 100 min to a temperature of 800° C. and exposed to an $SOCl_2$-saturated $O_2$ gas flow for a period of 1.5 h to remove impurities. The subsequent sintering was carried out at 1500° C. in a helium atmosphere with 2 vol/% chlorine gas addition, during which the green body was moved through the furnace at a rate of 3 mm/min. A transparent glass rod of 14 mm diameter was obtained the remaining impurities in which, particularly water and transition metals, were <50 ppb. The glass body had a density of 2.20 g/cm$^3$ and a refractive index of $n_D$=1.4592 and was free from bubbles and reams.

What is claimed is:

1. A method for the manufacturing of glass bodies, said method comprising:
   (a) forming a thixotropic suspension of silicon dioxide particles in a dispersing liquid;
   (b) converting said thixotropic suspension to a state of minimum viscosity;
   (c) charging an extruding press closed at its outlet with said thixotropic suspension while said suspension is in a state of minimum viscosity;
   (d) heating said suspension, while in said extruding press to a temperature below the boiling point of said dispersing liquid to thereby cause linking of silicon dioxide particles dispersed in said suspension and solidification of said suspension;
   (e) opening said extruding press and extruding a dimensionally stable green body formed of said solidified suspension from said press and
   (f) purifying and sintering said green body.

2. The method as claimed in claim 1 wherein the suspension is a suspension containing $SiO_2$ particles with a diameter in the range from 10 to 500 nm, preferably 15 to 100 nm, with a mean particle diameter of 40 nm.

3. The method as claimed in claim 1 wherein a suspension with a solids: dispersing liquid weight ratio of 1:0.8 to 1:2 is used.

4. The method as claimed in claim 1 wherein water is used as the dispersing liquid.

5. The method as claimed in claim 1 wherein an ionogenic substance which shifts the pH-value of the suspension towards the basic region (pH $\leq$ 10) is added to the suspension.

6. The method as claimed in claim 5 wherein an ammonium compound is used as the inorganic additive.

7. The method as claimed in claim 6 wherein an aqueous 5% $NH_4F$-solution is used as the additive.

8. The method as claimed in claim 5 wherein the ionogenic substance is added in a quantity of 0.1 to 5.0 wt %, of the solids content of the suspension.

9. The method as claimed in claim 7 wherein the suspension is an aqueous suspension which contains $SiO_2$ particles with a mean particle diameter of 40 nm and with a solids:water weight ratio of 1:1.1 and to which an aqueous $NH_4F$-solution is added in a quantity of 0.75 wt. % of the solids content of the suspension.

10. The method as claimed in claim 1 wherein the suspension is transformed into a state of minimum viscosity by the action of sound at a frequency of f=20 to 200 Hz or ultrasound at a frequency of f=20 to 50 kHz.

11. The method as claimed in claim 1 wherein the suspension is heated in the extruding press to a temperature below the boiling point of the dispersing liquid by the introduction of microwave energy of frequency f=2.5 GHz or high-frequency energy of frequency f=27 Mhz.

* * * * *

UNITED STATES PATENT AND TRADEMARK OFFICE
CERTIFICATE OF CORRECTION

PATENT NO. : 4,682,995
DATED : July 28, 1987
INVENTOR(S) : ROLF CLASEN

It is certified that error appears in the above-identified patent and that said Letters Patent is hereby corrected as shown below:

In the Claims:

Column 6, line 25, "inorganic" should be --ionogenic--.

Signed and Sealed this

Fifteenth Day of March, 1988

Attest:

DONALD J. QUIGG

Attesting Officer

Commissioner of Patents and Trademarks